US012628041B2

(12) United States Patent
Schwardmann et al.

(10) Patent No.: US 12,628,041 B2
(45) Date of Patent: May 12, 2026

(54) METHOD FOR OUTPUTTING A SIGNAL AS A FUNCTION OF A TRANSMISSION PATH TO BE SELECTED ON THE BASIS OF PREDICTION

(71) Applicant: Robert Bosch GmbH, Stuttgart (DE)

(72) Inventors: Jens Schwardmann, Hildesheim (DE); Khaled Shawky Hassan, Sarstedt (DE); Marie-Theres Suer, Braunschweig (DE); Philip Wette, Bueckeburg (DE); Sascha Guebner, Bodenburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 321 days.

(21) Appl. No.: 18/256,399

(22) PCT Filed: Dec. 8, 2021

(86) PCT No.: PCT/EP2021/084794
§ 371 (c)(1),
(2) Date: Jun. 7, 2023

(87) PCT Pub. No.: WO2022/128686
PCT Pub. Date: Jun. 23, 2022

(65) Prior Publication Data
US 2024/0022963 A1      Jan. 18, 2024

(30) Foreign Application Priority Data
Dec. 15, 2020      (DE) ..................... 10 2020 215 959.9

(51) Int. Cl.
*H04W 28/08*      (2023.01)
*H04W 40/12*      (2009.01)

(52) U.S. Cl.
CPC ... *H04W 28/0942* (2020.05); *H04W 28/0958* (2020.05); *H04W 40/12* (2013.01)

(58) Field of Classification Search
CPC ....... H04L 41/147; H04L 12/28; H04L 45/00; H04L 45/12; H04L 45/30; H04W 28/0865;
(Continued)

(56) References Cited

U.S. PATENT DOCUMENTS

RE44,606 E      11/2013  Herz et al.
2015/0319076 A1 *  11/2015  Vasseur ................. H04L 45/124
370/238
(Continued)

FOREIGN PATENT DOCUMENTS

CN         108667734 A      10/2018
CN         108809839 A      11/2018
WO      WO-2015039676 A1 *   3/2015   ............ H04W 48/20

OTHER PUBLICATIONS

International Search Report for PCT/EP2021/084794, Issued May 30, 2022.

*Primary Examiner* — Nathan S Taylor
(74) *Attorney, Agent, or Firm* — NORTON ROSE FULBRIGHT US LLP

(57)      ABSTRACT

A method for outputting a signal as a function of a transmission path to be selected, to transmit a data packet from a transmitter unit to a receiver unit connectable to the transmitter unit via at least two transmission paths. The method includes: ascertaining, in each instance, a prediction value of at least one transmission path parameter for each of the at least two transmission paths, using a short-term determination unit, to provide a transmission path information item including the predicted values, to a planning unit; selecting the transmission path to be used for transmitting the data packet, from the at least two transmission paths,
(Continued)

using the planning unit, based on the ascertained transmission path information item; and outputting the signal using the planning unit to transmit the data packet from the transmitter unit to the receiver unit on the selected transmission path.

14 Claims, 2 Drawing Sheets

(58) Field of Classification Search
CPC ......... H04W 28/0908; H04W 28/0942; H04W 28/0958; H04W 28/0967; H04W 40/12; H04W 28/08; H04W 40/18; H04W 88/06
See application file for complete search history.

(56) References Cited

U.S. PATENT DOCUMENTS

| | | | | |
|---|---|---|---|---|
| 2017/0250875 | A1* | 8/2017 | Jensen | H04L 41/16 |
| 2018/0227216 | A1* | 8/2018 | Hughes | H04L 45/54 |
| 2019/0230554 | A1* | 7/2019 | Kang | H04L 45/24 |
| 2019/0289499 | A1* | 9/2019 | Xia | H04L 67/56 |
| 2019/0349426 | A1* | 11/2019 | Smith | H04L 63/123 |
| 2020/0022060 | A1* | 1/2020 | Yu | H04L 1/0026 |
| 2020/0092181 | A1* | 3/2020 | Thiagarajan | H04L 45/121 |
| 2020/0128470 | A1* | 4/2020 | Mok | H04W 40/04 |
| 2020/0136957 | A1* | 4/2020 | Sanchez Charles | H04L 45/021 |
| 2020/0201292 | A1* | 6/2020 | Cella | G05B 23/0259 |
| 2020/0358886 | A1* | 11/2020 | Wei | H04L 1/1893 |
| 2021/0014766 | A1* | 1/2021 | Liu | H04W 48/16 |
| 2021/0133670 | A1* | 5/2021 | Cella | G06N 3/044 |
| 2021/0182996 | A1* | 6/2021 | Cella | G06Q 10/0631 |
| 2022/0036302 | A1* | 2/2022 | Cella | H04L 67/1097 |
| 2022/0108262 | A1* | 4/2022 | Cella | G05B 17/02 |
| 2022/0124846 | A1* | 4/2022 | Wang | H04W 28/0268 |

* cited by examiner

METHOD FOR OUTPUTTING A SIGNAL AS A FUNCTION OF A TRANSMISSION PATH TO BE SELECTED ON THE BASIS OF PREDICTION

FIELD

The present invention relates to a method and a planning unit for outputting a signal as a function of a transmission path to be selected, in order to transmit a data packet from a transmitter unit to a receiver unit connectable to the transmitter unit via at least two transmission paths; as well a method to train a neural network for use in this method. The present invention also includes use of a neural network for selecting a transmission path and a system for outputting a signal as a function of a transmission path to be selected. In addition, the present invention includes a method for outputting a control signal as a function of a data packet transmitted from a transmitter unit of a vehicle to a receiver unit outside of the vehicle, with the aid of the receiver unit, in order to control the vehicle indirectly or directly on the basis of the outputted control signal. The present invention further includes a computer program and a machine-readable storage medium.

BACKGROUND INFORMATION

Methods, such as Multipath TCP (transmission control protocol) or Multipath QUIC (quick UDP Internet connections), with the aid of which different paths, such as WLAN and mobile radio communication, may be used for data transmission between two terminals, are available. In addition to further methods, a widespread scheduling method is based on measured packet round-trip times (RTT's). In light of these, individual channels, which are used for transmitting data streams, are selected in the scheduler. Since only measured RTT's are used, the values are delayed and do not describe the performance that data packets still to be transmitted would experience. This is also the case for similar scheduling methods.

SUMMARY

The present invention includes a method for outputting a signal as a function of a transmission path to be selected, in order to transmit a data packet from a transmitter unit to a receiver unit connectable, in particular, connected, to the transmitter unit via at least two transmission paths.

According to an example embodiment of the present invention, the method includes a step of ascertaining, in each instance, a prediction value of at least one transmission path parameter for each of the at least two transmission paths, with the aid of a short-term determination unit, in order to provide a transmission path information item including the predicted values, to a planning unit; the prediction value being expected to be present during the transmission of the data packet from the transmitter unit to the receiver unit. In other words, this means that a prediction value of at least one transmission path parameter is ascertained for each of the at least two transmission paths; the prediction value representing a prediction of a value of the transmission path parameter expected to be present for the case of transmission of the data packet on the respective transmission path.

According to an example embodiment of the present invention, the method further includes a step of selecting, from the at least two transmission paths, the transmission path to be used for transmitting the data packet, on the basis of the ascertained transmission path information item, with the aid of the planning unit. This means, in other words, that on the basis of the ascertained transmission path information item, a transmission path, which is preferably to be used over a non-selected transmission path of the at least two transmission paths, is selected for transmitting the data packet.

According to an example embodiment of the present invention, the method further includes a step of outputting the signal as a function of the selected transmission path, with the aid of the planning unit, in order to transmit the data packet from the transmitter unit to the receiver unit, on the selected transmission path. In other words, this means that, in particular, in direct or indirect response to the outputted signal, the data packet is transmitted on the selected transmission path, from the transmitter unit to the receiver unit.

The present invention also includes a method for outputting a control signal as a function of a data packet transmitted from a transmitter unit of a vehicle to a receiver unit outside of the vehicle, with the aid of the receiver unit, in order to control the vehicle indirectly or directly on the basis of the outputted control signal.

According to an example embodiment of the present invention, the method includes a step of monitoring a surrounding area of the vehicle, using a sensor unit, which is positioned on the vehicle, monitors the surrounding area, and forms, in particular, an image, in order to supply the data packet, which includes sensor data that relates to the surrounding area of the vehicle and is generated by the sensor unit, to a planning unit of the transmitter unit, using a data preparation unit.

According to an example embodiment of the present invention, the method further includes the steps of the above-described method for outputting a signal as a function of a transmission path to be selected.

According to an example embodiment of the present invention, the method also includes a step of transmitting the data packet from the transmitter unit to the receiver unit, on the selected transmission path, in response to the outputted signal. The method further includes a step of outputting the control signal as a function of the transmitted data packet, with the aid of the receiver unit, in order to control the vehicle indirectly or directly on the basis of the outputted control signal, using, e.g., a braking action and/or steering action and/or drive unit intervention.

The present invention also includes a training method for training a neural network for use in a method for outputting a signal as a function of a transmission path to be selected, in order to transmit a data packet from a transmitter unit to a receiver unit connectable to the transmitter unit via at least two transmission paths.

According to an example embodiment of the present invention, in the training method, the neural network is provided one or more input variables for the training, selected from:

wireless technology of the transmission paths;

current characteristic of the transmission paths;

state of a network device contained by the transmitter unit;

one or more measured or estimated values of a transmission path parameter of the transmission paths;

packet characteristics of the packet to be transmitted;

state and/or characteristic of the transmitter unit;

current time of day and current day of the week.

In addition, the neural network is provided a setpoint value of an output variable of the neural network for training. In this connection, the setpoint value of the output variable is a measured value of at least one transmission path parameter of the at least two transmission paths; the measured value being measured during the transmission of the data packet from the transmitter unit to the receiver unit. In other words, this means that supervised learning and/or training of the neural network takes place within the scope of the training method.

According to an example embodiment of the present invention, a neural network trained according to the training method described above is advantageously used for selecting a transmission path, in order to transmit a data packet from a transmitter unit to a receiver unit connectable to the transmitter unit via at least two transmission paths.

The present invention further includes a planning unit for outputting a signal as a function of a transmission path to be selected, in order to transmit a data packet from a transmitter unit to a receiver unit connectable to the transmitter unit via at least two transmission paths. According to an example embodiment of the present invention, the planning unit is configured to receive, from a short-term determination unit, a transmission information item, which includes, in each instance, a prediction value of at least one transmission path parameter for each of the at least two transmission paths; the prediction value being expected to be present during the transmission of the data packet from the transmitter unit to the receiver unit. In addition, the planning further is configured to select, from the at least two transmission paths, the transmission path to be used for transmitting the data packet, on the basis of the ascertained transmission path information item. The planning unit is further configured to output the signal as a function of the selected transmission path, in order to transmit the data packet from the transmitter unit to the receiver unit on the selected transmission path.

The present invention further includes a system for outputting a signal as a function of a transmission path to be selected, in order to transmit a data packet from a transmitter unit to a receiver unit connectable to the transmitter unit via at least two transmission paths. According to an example embodiment of the present invention, the system includes a short-term determination unit, which is configured to ascertain, in each instance, a prediction value of at least one transmission path parameter for each of the at least two transmission paths, and to supply the prediction value to, in particular, the planning unit; the prediction value being expected to be present during the transmission of the data packet from the transmitter unit to the receiver unit. In addition, the system includes the planning unit described above.

In the scope of the present invention, a transmission path may be understood as a communication path in a communications network containing the transmitter unit and the receiver unit. The communications network may include one or more mobile subscriber networks and one or more mobile switching networks and, preferably, a part of the public Internet. It is possible for the communications network to include one or more cellular networks and/or one or more WLAN networks and/or one or more near field networks.

The transmission path may include one or more wireless partial transmission paths and/or one or more wired partial transmission paths. On the wired partial transmission path, the data packet is transmitted with the aid of a wired connection. On the wireless partial transmission path, the data packet is transmitted with the aid of a wireless connection, in particular, a radio link. The radio link may take the form of a WLAN connection, a mobile radio connection, such as a 4G or 5G connection, or a near-field communications connection.

The at least two transmission paths and/or communication paths differ with regard to transmission of the data packet on the transmission paths. It is possible for the transmission paths to differ with regard to a network provider, such as Vodafone, Telekom, etc., which operates at least a portion, in particular, of a wireless partial transmission path, of the transmission path. It is also possible for the transmission paths to differ with regard to a wireless technology of the transmission path, such as 4G, 5G, or WLAN. In addition, the further connection to the wired network may also differ up to completely different transmission paths, that is, the transmission paths do not share a common connection segment.

The transmission path includes a starting point and/or first end point contained by the transmitter unit and an end point and/or second end point contained by the receiver unit.

The first end point may be a protocol starting point of a communication protocol for transmitting the data packet from the transmitter unit to the receiver unit. It is possible for the first end point to be part of the transmitter unit, in particular, of the planning unit, of the short-term determination unit, or of a network device of the transmitter unit. It is also possible for the first end point to be part of a data provision unit supplying the data packet and/or the useful data contained by the data packet, or part of a sensor unit acquiring and/or generating the useful data.

The second end point may be a protocol end point of a communication protocol for transmitting the data packet from the transmitter unit to the receiver unit. It is possible for the second end point to be part of the receiver unit, in particular, of a protocol end point of the data unit, of a network stack, of a jitter buffer, or of a deduplicator of the receiver unit. It is also possible for the second end point to be part of a data sink receiving the data packet and/or the useful data contained by the data packet. It is also possible for the second end point to be an intermediate protocol point. The intermediate protocol point may be situated at an intermediate station between the transmitter unit and the receiver unit. The intermediate station may be, for example, a radio base station of a cellular network, or may be situated on a WLAN router.

The transmission path preferably extends from the planning unit of the transmitter unit to the protocol end point of the receiver unit, via and/or through, in particular, the network device of the transmitter unit assigned to the transmission path.

The data packet is transmitted on the transmission path, from the first end point to the second end point. The data packet may include, for example, video data or voice data, which are preferably generated and supplied by a, in particular, vehicle-side sensor unit.

According to an example embodiment of the present invention, the transmission path parameter is a parameter relevant to the transmission of the data packet on the transmission path and/or a parameter of the transmission path influencing the transmission of the data packet.

According to an example embodiment of the present invention, the prediction value of the transmission parameter is a predicted value, which the transmission parameter is expected to have and/or assume within a short time frame of less than or equal to 1 s, preferably, less than or equal to 100 ms, and particularly preferably, less than or equal to 20 ms; a period of time of the short time frame preferably running from a time of the end of the determination of the prediction value. It is also possible that in the determination of the prediction value for a transmission path and a transmission path parameter, a plurality of temporally consecutive prediction values are ascertained, in particular, a time characteristic, of the prediction value for the short time frame. The prediction value represents an expected value, which is preferably at least approximated, in particular, assumed, by the actual value.

It is also possible for the prediction value to include an extreme, in particular, minimum or maximum, value of the transmission parameter, which the transmission parameter is not expected to fall below or exceed within the short time frame.

According to an example embodiment of the present invention, the transmission path information item includes one or more prediction values for one or more transmission path parameters and one or more transmission paths. It is possible for the transmission path information item to be made up of the ascertained prediction values.

The short-term determination unit preferably takes the form of a software module. It is possible for the short-term determination unit to be part of hardware of the transmitter unit that contains the planning unit. The transmitter unit may take the form of, for example, a connectivity unit for a vehicle, which is preferably connected to other communications networks via one or more mostly wireless communication interfaces. However, the short-term determination unit and/or the planning unit may also be situated in other hardware, which is connected to the transmitter unit via a high-speed communications network.

According to an example embodiment of the present invention, the short-term determination unit may be configured to ascertain prediction values for a plurality of transmission path parameters for, in each instance, a transmission path, in order to provide the planning unit a transmission information item including a plurality of prediction values.

The signal outputted with the aid of the planning unit is preferably outputted to a unit, which is on the side of the transmitter unit and is assigned to the selected transmission path. In particular, the signal is outputted to a network device of the transmitter unit assigned to the selected transmission path, in order to transmit the data packet to the receiver unit, using this network device. It is possible for the outputted signal to include the data packet or to be made up of the data packet. It is also possible for the signal to include an instruction to the network device regarding transmission of the data packet. It is possible for this instruction to include one or more requirements for the transmission of the data packet, such as a requirement for the transmission latency or the reliability of the transmission. In addition, it is possible for the instruction to include a quality of service (QoS) class for the packet. The signal preferably outputted to the network device is, in particular, a wire-conducted signal or, alternatively, a signal transmitted wirelessly.

According to an example embodiment of the present invention, the training method for training the neural network may be executed and/or carried out prior to or at the running time of the method for outputting a signal as a function of a transmission path to be selected.

According to an example embodiment of the present invention, the training method may include a step of acquiring measurement data, in order to train the neural network on the basis of the acquired measurement data. In other words, this means that, for example, in the scope of a measuring campaign, measurement data are gathered, which are usable or used for the learning of the model. Measurement data are preferably acquired over a time frame that is as long as possible, and/or over various spatial regions.

According to an example embodiment of the present invention, in the step of acquiring measurement data, the one or more input variables and the one or more output variables are preferably measured for training the neural network. The measurement data are preferably ascertained for different receiver units, e.g., different servers. If the method is used mainly for a data packet to be transmitted to the same receiver unit, the measurement data may also be acquired in a limited manner for this receiver unit. It is also possible for the measurement data to be acquired for data packets of different packet sizes. In this case, the packet size is also to be viewed as an input variable for the neural network.

The input variables usable for training the neural network are listed below. The input variables usable for training the neural network may correspond partially or completely to the input variables of the neural network during the execution of the method for outputting a signal as a function of a transmission path to be selected.

The wireless technology may be, for example, 5G, LTE, UMTS, GPRS or WLAN.

In the case of mobile radio communication, the current characteristic of the transmission path may be a signal strength, such as SINR (signal to interference plus noise ratio), RSSI (received signal strength indication), RSRQ (reference signal received quality), CQI (channel quality indicator), a bandwidth or carrier frequency, a path loss, a modulation and coding scheme (MCS), a number of available resource blocks, a transmission power (Tx power), and/or an event, such as a handover between wireless technologies and/or radio cells and/or network providers. In addition, different time-related parameters, such as the time passed since the packet last transmitted, may also be considered.

In the case of WLAN, the current characteristic of the transmission path may be a bandwidth, carrier frequency, RSSI, or other signal strength indicators, a modulation and coding scheme (MCS), and/or an event, such as the establishment of a connection to and/or disconnection from a hotspot.

The state of the network device may be, for example, a buffer fill level or queuing latency. In the case of a network device taking the form of a mobile radio modem, the state of the network device may be read out directly from the mobile radio modem and/or estimated on the basis of the quantity of data, which was last transferred to the mobile radio modem. In addition, a transmission rate of the mobile radio modem may also be read out or estimated.

In the case of a network device taking the form of a WLAN adaptor, the state may be read and/or estimated directly from a driver of the operating system of the WLAN adaptor. Alternatively, or in addition, a latency of the transmission path may be estimated and/or measured with the aid of, e.g., active queue management carried out by a mobile radio modem.

The one or more measured values of a transmission path parameter of the transmission paths may include, for example, a measured value of the latency, in particular, of the one-way latency. Temporal synchronization between the transmitter unit and the receiver unit is advantageous for this. In addition, the measured value of the transmission path parameter is transmitted to the transmitter unit with the aid of the receiver unit. Alternatively, or in addition, e.g., a latency ascertained in light of a packet cycling time may be used. The measured value of the latency may also be a measured value of the latency from the starting point of the transmission path to an intermediate protocol point on the transmission path. The intermediate protocol point may be, e.g., a point of a radio base station of a cellular network traversed by the transmission path, or a point on a WLAN router.

The one or more estimated values of a transmission path parameter, in particular, the transmission rate, of the transmission paths, may be ascertained, e.g., in light of an evaluation of a speed, with the aid of which a queue of the network device is cleared, in light of further predictions of the transmission quality described, e.g., in German Patent Application No. DE 10 2018 219 585 A1, or in light of a probing approach, e.g., on the basis of packet trains.

The packet characteristics may include the size or a quantified importance of the packet.

The transmitter unit state may be a current location, a current velocity vector, or an antenna pattern of the transmitter unit.

The transmitter unit is preferably a vehicle-side transmitter unit, that is, a transmitter unit situated on a vehicle. In particular, the transmitter unit is connected to a sensor unit, which is situated on the vehicle and preferably monitors surroundings of the vehicle, or the transmitter unit contains such a sensor unit. For example, the transmitter unit may take the form of a connectivity unit, in particular, of a vehicle, which is preferably connectable or connected in a wireless or wired manner to one or more control units of the vehicle taking the form of data provision units.

The receiver unit is preferably a receiver unit outside of a vehicle and/or situated away from a vehicle. It is possible for the receiver unit to be part of a cloud computing system or a server backend.

Using the method of the present invention and the planning unit of the present invention, it is now possible to take a short-term prediction of the transmission path parameter into consideration during the selection of a transmission path for a data packet, in order to individually ascertain a transmission path having expectedly suitable transmission conditions, for the respective data packet, without additional hardware. This is particularly advantageous in scenarios, in which the transmission conditions and/or the characteristics of the transmission paths change rapidly and/or often, such as in V2X communication. By ascertaining the prediction values, anticipated sharp changes in the transmission conditions may be detected in time and/or predicted, in order to ascertain a suitable transmission path for the specific data packet in a highly dynamic and reliable manner. In this manner, e.g., particularly low latencies may be attained in the data transmission, in order to render possible an improved quality of experience, a higher level of availability, and/or more comfort in applications such as teleoperated driving. In addition, the approach put forward here produces an advantage in that, for the selection of the transmission path, the prediction values for the transmission path from the transmitter unit to the receiver unit are taken into consideration, in contrast to a round trip back to the transmitter unit, which allows improved scheduling in the case of asymmetric channels such as LTE.

According to an example embodiment of the present invention, it is advantageous for the ascertained prediction value expected to be present to have or exceed a predefined and/or specifiable confidence threshold value for a short time frame of less than or equal to 1 s, preferably, less than or equal to 100 ms, and particularly preferably, less than or equal to 20 ms. The ascertaining of the prediction value may include prediction and/or arithmetic forecasting of the prediction value. In this connection, a confidence value is assigned to the ascertained prediction value; the confidence value representing an accuracy and/or reliability of the actual presence of the ascertained prediction value during the transmission of the data packet. In addition, the determination of the prediction value may also include prediction and/or arithmetic forecasting of a maximum or minimum value of the transmission parameter. In the case of a latency, for example, a maximum value is outputted that corresponds to a predefined and/or specifiable confidence. It is particularly preferable for the prediction value for the short time frame to have a confidence value, which is in a range of greater than or equal to 80 or 90 percent and less than or equal to 100%. The confidence threshold value may be, for example, in a range of greater than or equal to 80% or 90% and less than or equal to 99%, in particular, of greater than or equal to 99% and less than or equal to 100%. Using this embodiment, transmission of the data packet may also take place reliably on a packet-individual, particularly suitable transmission path, under highly dynamic transmission conditions including sharp and frequent changes.

According to an example embodiment of the present invention, it is also advantageous for the transmission path parameter to include at least one parameter, which is selected from:

latency of the transmission path;
transmission rate of the transmission path;
packet error rate and/or packet loss rate of the transmission path;
number of repeated transmissions on the transmission path;
power demand for transmission on the transmission path.

Within the scope of the present invention, a latency of the transmission path may be understood as a time, which is needed for transmitting the data packet on the transmission path from the transmitter unit to the receiver unit.

In the scope of the present invention, the transmission rate of the transmission path may be understood as a data transmission rate and/or a data transmission speed, that is, a number of information units transmitted per unit time. The packet error rate represents the number of data packets transmitted incorrectly relative to the number of data packets transmitted. The packet loss rate represents the number of data packets lost during transmission relative of the number of data packets transmitted.

The number of repeat transmissions, that is, retransmissions, on the transmission path represents the number of necessary repeat transmissions, when the data packet is transmitted on the transmission path. It is also possible for the number of repeat transmissions per unit time to be used alternatively or additionally to an absolute number of repeat transmissions.

The power demand for transmission on the transmission path represents a power demand and/or power consumption of the transmitter unit and/or a network device contained by the transmitter unit, when the data packet is transmitted on the, in particular, transmission path assigned to the network device. It is possible for the power demand of a specific network device assigned to the transmitter unit to be derived on the basis of the predicted number of repeat transmissions and/or the expected transmission power.

It is also possible that in the step of determining the prediction value for a plurality of transmission path parameters and for each of the transmission paths, in each instance, a prediction value is ascertained. For example, prediction values may be ascertained for the latency and the power demand.

Using this embodiment of the present invention, the transmission path may be ascertained in an optimum manner with regard to one or more transmission path parameters, in order to ensure a transmission quality and reliability, e.g., in applications, which benefit from a low overall latency and/or a low level of jitter, a high transmission rate, a low packet error rate and/or packet loss rate, a low number of repeat transmissions, or a low power demand.

According to an example embodiment of the present invention, it is also advantageous for the short-term determination unit to include at least one neural network. The neural network may be part of the short-term determination unit or assigned to the short-term determination unit. It is possible for the short-term determination unit to be configured to access an instance and/or a duplicate of a neural network stored outside of the short-term determination unit. In this connection, it is possible for at least two short-term determination units to ascertain the prediction values, using one instance each of the same neural network.

According to an example embodiment of the present invention, in response to one or more input variables, the neural network is configured to ascertain, as an output variable, the prediction value of the transmission path parameter for at least one of the transmission paths. In this connection, the input variable includes one or more elements, which are selected from:

wireless technology of the transmission paths;
   current characteristic of the transmission paths;
   state of a network device contained by the transmitter
      unit;
   one or more measured or estimated values of a transmis-
      sion path parameter of the transmission paths;
   packet characteristics of the packet to be transmitted;
   state and/or characteristic of the transmitter unit;
   current time of day and current day of the week.

In this connection, the input variables may be measured, estimated, and/or predicted values of the listed elements. For example, a prediction of a variable representing a transmission quality, such as a transmission rate of the transmission path, in which case the prediction is ascertained with the aid of a short-term determination unit outside of the transmitter unit, may be used as an input variable for the neural network, in order to optimize the prediction.

The neural network preferably takes the form of a recurrent neural network. It is also possible for the neural network to take the form of a feedforward network. It is further possible for the neural network to include at least one functional block having long short-term memory (LSTM).

Current values of the above-mentioned variables are preferably used for an LSTM network. For the case of a feedforward network, values of the above-mentioned variables from data from a time range of less than or equal to 30 s, preferably, less than or equal to 5 s, preferably, less than or equal to 100 ms prior to the determination of the prediction value may be used.

In the case of use of the neural network according to the present invention, measurement data regarding the input and/or output variables used for training the neural network are preferably acquired. The neural network may be configured to be trained additionally on the basis of the acquired measurement data, in particular, during or after execution of the method for outputting a signal, in order to continue learning in an automated manner and on the basis of the practical application.

According to one preferred specific embodiment of the present invention, a separate neural network may be provided and/or used for each of the at least two transmission paths, if the transmission paths differ from each other with regard to wireless technology and/or network provider.

It is possible that for an application, which may compensate for a certain portion of packet errors, using, for example, coding or FEC methods, in addition to the prediction of a first transmission path parameter, such as the latency, with the aid of a first neural network of the short-term determination unit, a second neural network of the short-term determination unit is used, in order to predict a second transmission path parameter, such as the packet error rate. The output variables of the neural networks, that is, the respective prediction values for the latency and the packet error rate, may be weighted on the basis of a requirement of the application, in order to select the transmission path to be used for transmitting the data packet. Thus, for example, a transmission path could have a lower packet error rate, but a higher latency; however, another transmission path may have a slightly increased packet error rate with a lower latency. According to this specific embodiment, the planning unit is configured to select the latter transmission path, if it still satisfies the packet error requirements of the application, and if it is more important for the application that the packets have a lower latency, than that the packet error rate is minimized further.

By using a neural network, the prediction values of the transmission path parameter may also be ascertained reliably and efficiently in a highly dynamic system.

According to an example embodiment of the present invention, it is also advantageous for the transmission path to be selected as a function of a predefined and/or specifiable threshold value for the prediction value. It is possible that for one or more of the transmission path parameters, in each instance, the ascertained prediction values are compared to the threshold value preferably specific to the respective transmission path parameter, and in view of the comparison, suitable transmission paths are distinguished from unsuitable ones. In this connection, it is possible for only transmission paths to be considered for the transmission of the data packet, whose prediction values are less than or equal to the predefined and/or specifiable threshold value. Using this embodiment, one or more suitable transmission paths may be selected from the at least two transmission paths, in order to take into account the requirements for the value of the transmission path parameter during the transmission of the data packet.

According to an example embodiment of the present invention, the threshold value for the prediction value is preferably received by a data provision unit supplying contents of the data packet. The data provision unit may be part of a data source, such as a sensor unit, situated outside of the planning unit, or may be assigned to the data source. To this end, the planning unit may include a software and/or hardware interface for communication with the data provision unit. For example, the data provision unit may transmit a latency budget for the data packet to the planning unit, via the interface. In response to the transmitted latency budget, it may be ascertained, with the aid of the planning unit, whether the selected transmission path(s) allow timely transmission of the data packet within the latency budget, or whether transmission of the data packet does not happen, in order not to increase a data load and/or channel loading of the transmission path. It is also possible that in response to the transmitted latency budget, it is determined, with the aid of the planning unit, whether the selected transmission path(s) allow timely (further) retransmission of the data packet within the latency budget, or whether a (further) retransmission of the data packet does not happen. In this manner, transmission of a data packet not (no longer) relevant to the receiver unit is prevented.

Using this embodiment of the present invention, the data provision unit may supply application-specific threshold values for the transmission path parameter, in order to transmit the data packet on a transmission path suitable according to the requirements of the application.

Alternatively, or in addition, it is advantageous for the transmission path to be selected as a transmission path having an extreme, in particular, minimum, prediction value. In other words, this means that the transmission path having the largest or smallest prediction value for the transmission path parameter is selected from the at least two transmission paths. Using this embodiment, a transmission path may be selected in a particularly simple manner by direct comparison of the ascertained prediction values.

According to an example embodiment of the present invention, the method advantageously includes a step of preselecting the at least two transmission paths from at least three transmission paths with the aid of the planning unit. In other words, this means that a transmission path available at least in principle for transmitting the data packet is discarded, in particular, in view of the data packet to be transmitted and/or the characteristics of the transmission path. This may take place, e.g., on the basis of the wireless technology utilized; for example, WLAN has, inter alia, lower costs and lower latency than mobile radio communication; or this may be the case in the event of a conventional handover of a cellular modem, which results in higher latency. In addition, this may allow, e.g., such transmission paths to be sorted out, for which an available volume of data is already exhausted. Using this embodiment, the number of calculations carried out by the short-term determination unit may be reduced for improved efficiency of the method.

According to an example embodiment of the present invention, the selection of the data transmission path advantageously includes a selection of at least one further data transmission path on the basis of the ascertained transmission path information item, from at least three transmission paths, with the aid of the planning unit. In this manner, the data packet may be transmitted by the transmitter unit to the receiver unit in duplicate form on the at least two selected transmission paths, if, for example, a reliability of the transmission is prioritized higher than a power consumption of the transmission. It is also possible for the transmission path, for which, e.g., the monetary transmission costs are lowest, to be selected from the at least two selected transmission paths.

This embodiment of the present invention may increase, in particular, the reliability of the method or adhere to a predefined latency limit on the receiver unit with a higher probability or, alternatively, take into account additional, unpredicted influence variables.

According to a further specific embodiment of the present invention, it is possible that, e.g., for a battery-operated transmitter unit, the transmission path that fulfills an additional criterion, for which, in particular, a prediction value has not been ascertained, is selected from the selected and the further, selected transmission path with the aid of the planning unit. For example, the transmission path, whose power consumption is lowest, and which simultaneously adheres to a predefined latency limit, may be selected.

According to a further specific embodiment of the present invention, it is also possible for all of the transmission paths, which satisfy latency requirements of the underlying application, e.g., teleoperated driving, to be selected with the aid of the short-term determination unit. In this connection, a round robin or a minimum buffer scheduling method could be applied to the selected transmission paths, in order to distribute the load over all of the transmission paths usable for the application.

In addition, according to an example embodiment of the present invention, it is advantageous for the transmission path information item to be transmitted to a data provision unit supplying contents of the data packet, and for contents and/or a transmission time and/or a transmission frequency of one or more data packets to be transmitted in the future, in particular, within the short time frame, to be adapted to the ascertained transmission path information item with the aid of the data provision unit and/or the planning unit. For example, it is possible for the transmission path information item to be transmitted with prediction values for the latency of the data packet to the data provision unit, on the transmission paths, so that in response to the received transmission path information item of, e.g., a sensor compression of a sensor unit contained by the data provision unit, the data provision unit is increased or decreased, and/or a frequency of data and/or data packets to be transmitted periodically is adapted to the transmission path information item.

According to an example embodiment of the present invention, the data provision unit may include a data source, such as a sensor unit, or be connected to the data source for reception of data and/or data packets to be transmitted. This embodiment is able to adapt the provision of the data packets to the expected transmission conditions, in order to implement, e.g., at least a minimum requirement of the application regarding the data transmission, which is necessary, e.g., for safe operation of a remote-controlled vehicle.

According to an example embodiment of the present invention, it is also advantageous, when for each of the transmission paths, the transmission path information item further includes another prediction value, expected to be present, of the at least one transmission path parameter, ascertained with the aid of a short-term determination unit outside of the transmitter unit. The short-term determination unit outside of the transmitter unit may be, e.g., part of a cellular network or a server unit or cloud computing unit of a cellular network operator. In addition, it is possible for prediction values, anticipated to be present, of other determination units outside of the transmitter unit, to be used, in order to take into account long-established characteristics of the transmission paths. These may be considered, e.g., as further input variables for the short-term determination unit.

It is possible for the further prediction values ascertained with the aid of the short-term determination unit outside of the transmitter unit to be used for checking the plausibility of the prediction values ascertained with the aid of the short-term determination unit preferably on the side of the transmitter unit. This may allow a confidence of the ascertained prediction values to be increased.

In the case of considerable differences between the prediction values and the further prediction values, the prediction values more disadvantageous for the transmission may be used for selecting the transmission path, in order to enable a worst-case estimation of the transmission conditions. It is possible for a selection between the prediction values and the further prediction values to take place adaptively, by monitoring, for a long period of time, the short-term determination units, which have ascertained more accurate prediction values in the past.

Alternatively, or in addition, the input variables for the short-term determination unit, in particular, for the neural network of the short-term determination unit, may be transmitted wirelessly or in a wire-conducted manner to the short-term determination unit outside of the transmitter unit, in order to optimize the short-term determination unit outside of the transmitter unit. It is also possible for an information item regarding a significant difference between the prediction values and the further prediction values and/or regarding a lower prediction quality of the short-term determination unit outside of the transmitter unit to be transmitted to the short-term determination unit outside of the transmitter unit. This may allow the short-term determination unit outside of the transmitter unit to be optimized, for example, by a cellular service provider, in particular, if the short-term determination unit outside of the transmitter unit receives the above-mentioned information item from a plurality of short-term determination units.

By ascertaining further prediction values with the aid of a short-term determination unit outside of the transmitter unit, the prediction quality may be improved further, in order to enable a particularly reliable prediction for unlearned and/or untrained surrounding-area conditions, as well, such as a geographic position not assumed previously by the transmitter unit.

According to one specific embodiment of the present invention, the method may also be used in an analogous manner to select a selected transmission path for transmitting a data packet from the receiver unit to the transmitter unit. It is possible for a short-term determination unit to be provided on the side of a receiver unit; the short-term determination unit being configured to ascertain prediction values for a transmission path parameter of a plurality of available feedback paths. Relevant, necessary input variables for ascertaining the prediction values may be supplied, in particular, by the transmitter unit. As an alternative, a further neural network assigned to the transmitter unit may be trained, in order to supply the ascertained prediction values for the feedback paths of the receiver unit. In this manner, even in the case of asymmetric channels of a cellular network, for which a one-way latency is different in the forward and reverse transmission directions, optimization of the transmission of individual data packets on the forward and reverse paths may take place.

The above-described method for outputting a signal is advantageously repeated several times, in order to transmit a plurality of data packets from the transmitter unit to the receiver unit. The method is preferably carried out separately for each of the data packets.

According to an example embodiment of the present invention, it is also advantageous for the system to include at least a first and a second network device. The first network device is configured to output the data packet to the receiver unit, on a first of the at least two transmission paths, in response to the outputted signal. The second network device is configured to output the data packet to the receiver unit, on a second of the at least two transmission paths, in response to the outputted signal.

Each of the network devices is preferably assigned a transmission path and/or a network provider. The network device may take the form of a modem or user terminal (user equipment) or include a modem or a user terminal. It is also possible for the network device to include one or more SIM cards. The network device may be configured to select a radio access network from at least two or more radio access networks, e.g., on the basis of a current signal strength of the radio access networks. Alternatively, one or more network devices are configured to establish a connection to a radio access network of always the same cellular technology, such as 4G or 5G, in order to transmit the data packet.

In other words, this means that in place of different network devices having connections to radio access networks of different cellular network providers, a network device, which has different identities and/or is suited to the use of different radio access technologies, may also be used. For example, the network takes the form of a multi-SIM user terminal. It is possible for the network device to be configured to communicate simultaneously with more than one radio cell of different mobile radio communication providers or the same mobile radio communication provider. The radio cells may be from different cellular network providers, or may be connected to the network device with the aid of different radio access networks.

Using this embodiment of the present invention, even in the case of varying surrounding-area conditions, the data packet is transmitted reliably to the receiver unit on the most suitable transmission path according to the requirements.

According to an example embodiment of the present invention, additionally advantageous, is a computer program product or computer program including program code, which may be stored in a machine-readable carrier or storage medium, such as a solid state memory, a hard disk storage device or an optical storage device and is used for performing, implementing and/or controlling the steps of the method according to one of the above-described specific embodiments, in particular, when the program product or program is executed on a computer or a control unit.

In the following, the present invention shall be explained in greater detail in light of the figures.

DETAILED DESCRIPTION OF EXAMPLE EMBODIMENTS

Figure 1:
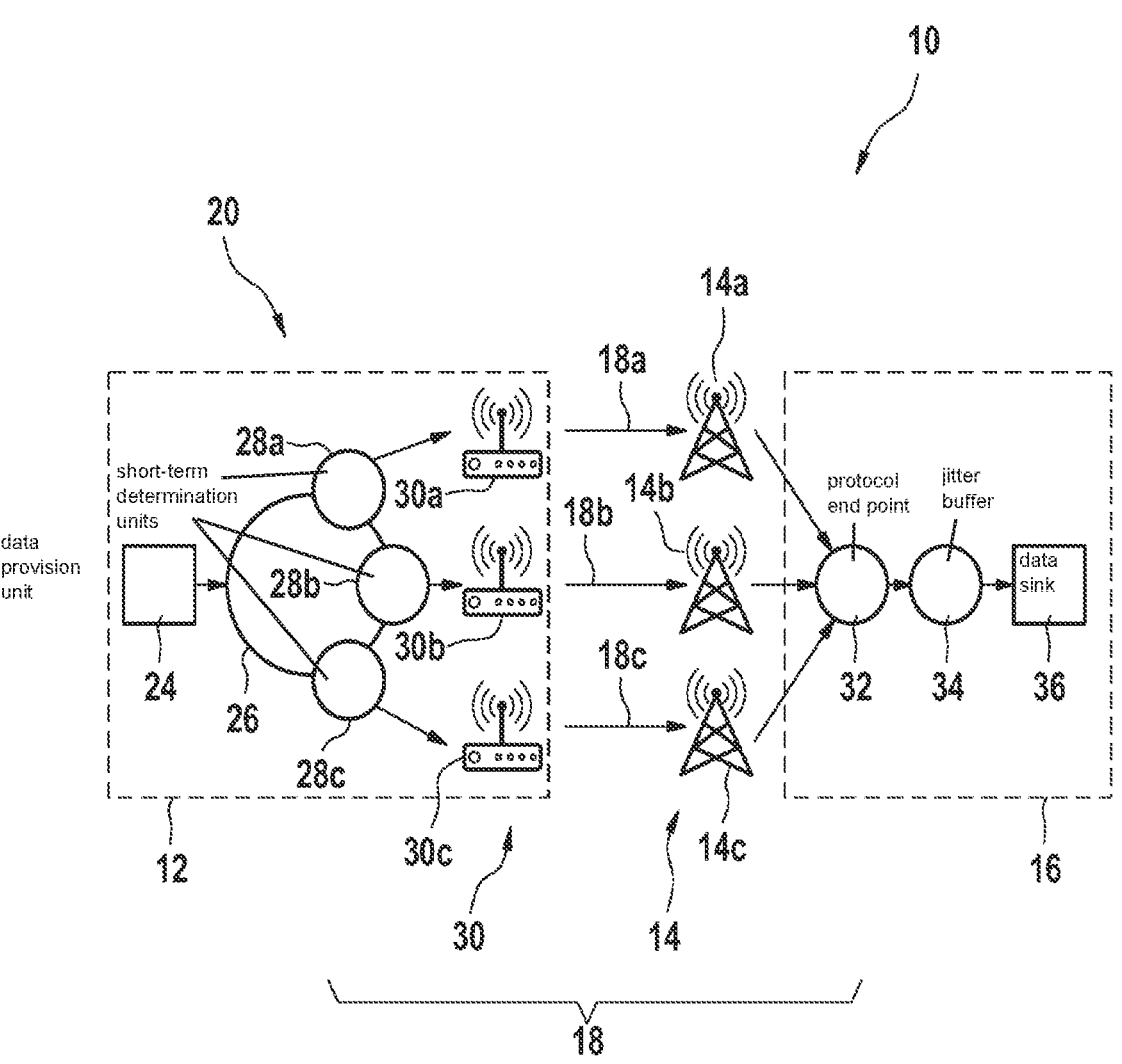
FIG. 1 shows a schematic representation of a communication system including a system for outputting a signal as a function of a transmission path to be selected, according to an example embodiment of the present invention.

In the subsequent description of preferred exemplary embodiments of the present invention, the same or similar reference numerals are used for the elements that are shown in the different figures and act similarly, in which case a repeated description of these elements is omitted.

FIG. 1 shows schematically the set-up of a communication system 10. The communication system includes a transmitter unit 12, a communications network 14, and a receiver unit 16.

Transmitter unit 12 is connected to receiver unit 16 by at least three transmission paths 18a, 18b, 18c, which are denoted as a whole by reference numeral 18. Transmission paths 18a, 18b, 18c each represent a communication path 18a, 18b, 18c for a data packet to be transmitted from transmitter unit 12 through communications network 14 to receiver unit 16.

In a first preferred specific embodiment, communications network 14 includes cellular networks 14a, 14b, 14c of different network providers. Cellular networks 14a, 14b, 14c each include a mobile switching network and a radio access network. It is possible for one or more of cellular networks 14a, 14b, 14c to be configured to transmit data packets, using different cellular technologies, such as 4G or 5G. In addition, communications network 14 includes the public Internet.

In a second preferred specific embodiment, communications network 14 includes at least two cellular networks 14a, 14b. It is possible for at least a first cellular network 14a and a second cellular network 14b to be operated by the same network provider. In this connection, first cellular network 14a is configured to transmit the data packet, using a first cellular technology, such as 5G. Second cellular network 14b is configured to transmit the data packet, using a second cellular technology different from the first cellular technology, e.g., 4G.

Transmitter unit 12 includes a system 20 for outputting a signal as a function of a transmission path 18a, 18b, 18c to be selected, in order to transmit a data packet from transmitter unit 12 to the receiver unit 16 connected to transmitter unit 12 via at least two transmission paths 18a, 18b, 18c. In addition, transmitter unit 12 includes a data provision unit 24. Data provision unit 24 includes a data source and is configured to provide system 20 a data packet with the aid of an interface; the data packet including data to be transmitted to receiver unit 16.

System 20 further includes a planning unit 26 taking the form of a scheduler 26, and three short-term determination units 28a, 28b, 28c. Furthermore, system 20 includes three network devices 30a, 30b, 30c taking the form of mobile radio communication modems 30a, 30b, 30c.

The receiver unit 16 receiving the data packet includes a protocol end point 32, optionally, a jitter buffer 34 configured for packet reordering, and a data sink 36.

According to the present specific embodiment, transmission paths 18a, 18b, 18c each extend from planning unit 26 through network devices 30a, 30b, 30c assigned to transmission paths 18a, 18b, 18c, respectively, to protocol end point 32 of receiver unit 16. In other words, this means that planning unit 26 represents a starting point of transmission paths 18a, 18b, 18c, and protocol end point 32 represents an end point of transmission paths 18a, 18b, 18c.

Short-term determination units 28a, 28b, 28c each include a recurrent or feedforward neural network. In response to one or more input variables, each of the neural networks is configured to ascertain, as an output variable, the prediction value of the transmission path parameter for, in each instance, one of transmission paths 18a, 18b, 18c. In this connection, each of the neural networks is configured to ascertain a prediction value of at least one transmission path parameter for respective transmission path 18a, 18b, 18c; the prediction value being expected to be present during the transmission of the data packet from transmitter unit 12 to receiver unit 16. According to the present exemplary embodiment, the transmission path parameter takes the form of a latency of the data packet on transmission path 18a, 18b, 18c.

In other words, this means that each of the neural networks is configured to generate a short-term prediction of the expected latency on the specific transmission path 18a, 18b, 18c, and/or to ascertain the expected latency for a short time frame of a few seconds, in particular, less than or equal to 1 s.

The input variables for ascertaining the prediction value may be, e.g., indicators from respective network device 30a, 30b, 30c. The input variables may be, e.g., a packet size of the data packet to be transmitted, an average latency of transmission paths 18a, 18b, 18c measured over a predefined and/or specifiable time frame, and currently measured characteristics of transmission paths 18a, 18b, 18c. One particularly advantageous combination of input variables includes the number of available resource blocks, the current modulation and coding scheme (MCS), the utilized wireless technology of the transmission paths 18a, 18b, 18c, the measured one-way latency on transmission paths 18a, 18b, 18c, as well as the packet size of the packet to be transmitted.

Short-term determination units 28a, 28b, 28c are configured to supply the prediction values of the latency of planning unit 26 in the form of a transmission path information item; the prediction values being ascertained with the aid of the neural network.

Thus, short-term determination units 28a, 28b, 28c are configured to provide a prediction of one-way latencies of a transmission path 18a, 18b, 18c, that is, communication path 18a, 18b, 18c, respectively. The prediction values of the latencies take into account the respective, complete transmission path 18a, 18b, 18c from transmitter unit 12 to receiver unit 16.

Planning unit 26 is configured to receive the supplied transmission information item including the prediction values of the latency, from short-term determination units 28a, 28b, 28c. Planning unit 26 is further configured to select, from available transmission paths 18a, 18b, 18c, the transmission path 18a, 18b, 18c to be used for transmitting the data packet, on the basis of the ascertained transmission path information item.

Thus, for each data packet in a multipath transport protocol, planning unit 26 is configured to decide the communication path 18a, 18b, 18c, on which the data packet is intended to be transmitted to receiver unit 16.

According to this specific embodiment, a high-frequency prediction of the end-to-end latency is used to send each data packet, e.g., on the transmission path 18a, 18b, 18c, which has the lowest predicted latency.

Thus, according to the present specific embodiment, for each data packet, planning unit 26 is configured to individually decide, in light of a predicted end-to-end latency per available transmission path 18a, 18b, 18c, the transmission path 18a, 18b, 18c, which is used for the transmission of the data packet.

Planning unit 26 is further configured to output a signal to corresponding network device 30a, 30b, 30c as a function of selected transmission path 18a, 18b, 18c. Corresponding network device 30a, 30b, 30c is configured to transmit the data packet to receiver unit 16, on selected transmission path 18a, 18b, 18c, in response to the signal outputted by planning unit 26.

Figure 2:
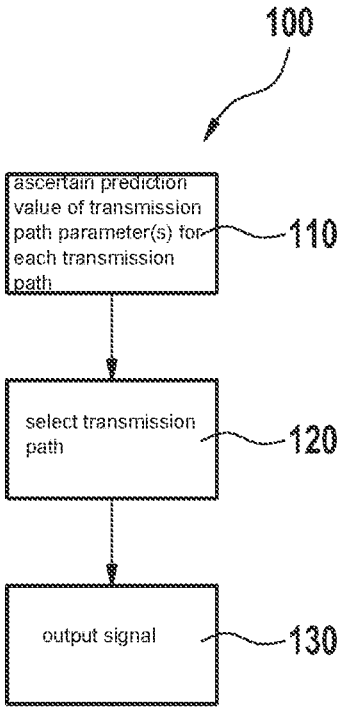
FIG. 2 shows a flow chart of a method for outputting a signal as a function of a transmission path to be selected, according to an example embodiment of the present invention.

FIG. 2 shows a flow chart of a method for outputting a signal as a function of a transmission path to be selected. The method as a whole is denoted by reference numeral 100.

Method 100 enables the transmission of a data packet from a transmitter unit, on a selected transmission path, to a receiver unit connectable to the transmitter unit by at least two transmission paths, for example, in a communication system according to FIG. 1.

In step 110, in each instance, a prediction value of at least one transmission path parameter for each of the at least two transmission paths is ascertained with the aid of a short-term determination unit, in order to provide a transmission path information item including the prediction values, to a planning unit; the prediction value being expected to be present during the transmission of the data packet from the transmitter unit to the receiver unit.

In step 120, a transmission path to be used for transmitting the data packet is selected from the at least two transmission paths with the aid of the planning unit, on the basis of the ascertained transmission path information item.

In step 130, a signal is outputted with the aid of the planning unit, as a function of the selected transmission path, in order to transmit the data packet from the transmitter unit to the receiver unit, on the selected transmission path.

If an exemplary embodiment includes an "and/or" conjunction between a first feature and a second feature, then this is to be read such that, according to one specific embodiment, the exemplary embodiment includes both the first feature and the second feature, and according to another specific embodiment, the exemplary embodiment includes either only the first feature or only the second feature.

What is claimed is:

1. A method comprising:
for each particular data packet of a plurality of data packets, responsive to the particular data packet becoming available for transmission by a transmitter:
ascertaining, using a determination unit, a respective prediction value of at least one transmission path parameter for each of at least two transmission paths via which a receiver is connectable to the transmitter, wherein a transmission path information item including the prediction values is provided to a planning unit associated with the transmitter and wherein each of the prediction values is a value, which the determination unit predicts specifically for the particular data packet, will be present during a transmission of the particular data packet from the transmitter to the receiver;
making a selection for the particular data packet, wherein:
the selection includes selecting, using the planning unit and based on the transmission path information item, one transmission path of the at least two transmission paths; and
the selected transmission path is selected to be used for transmitting the particular data packet; and
outputting, using the planning unit and as a function of the selected transmission path, a transmission instruction signal that instructs the transmitter to perform the transmission of the particular data packet on the selected transmission path;
wherein the planning unit performs the selecting specifically for transmissions from the transmitter independent of any path selection performed for other transmitters.

2. The method as recited in claim 1, wherein the prediction value is associated with a predefined and/or specifiable confidence level indicating a probability that the predicted value will match an actual value observed during transmission of the particular data packet, the confidence level being defined for a time window of less than or equal to 1 s.

3. The method as recited in claim 1, wherein the prediction value is associated with a predefined and/or specifiable confidence level indicating a probability that the predicted value will match an actual value observed during transmission of the particular data packet, the confidence level being defined for a time window of less than or equal to 100 s.

4. The method as recited in claim 1, wherein the prediction value is associated with a predefined and/or specifiable confidence level indicating a probability that the predicted value will match an actual value observed during transmission of the particular data packet, the confidence level being defined for a time window of less than or equal to 20 s.

5. The method as recited in claim 1, wherein the transmission path parameter includes at least one parameter from a group consisting of:
latency of the transmission path;
transmission rate of the transmission path;

packet error rate and/or packet loss rate of the transmission path;
number of repeat transmissions on the transmission path; and
power demand for a transmission on the transmission path.

6. The method as recited in claim 1, wherein the determination unit includes at least one neural network, which, in response to one or more input variables, is configured to ascertain, as an output variable, the prediction value of the transmission path parameter for at least one of the transmission paths, the input variable including one or more elements from a group consisting of:
wireless technology of the transmission paths;
current characteristic of the transmission paths;
state of a network device contained by the transmitter unit;
one or more measured or estimated values of a transmission path parameter of the transmission paths;
packet characteristics of the packet to be transmitted;
state and/or characteristic of the transmitter unit; and
current time of day and current day of the week.

7. The method as recited in claim 1, wherein the selected transmission path for the particular data packet is chosen as a function of:
a predefined and/or specifiable threshold value for the prediction value, which is received by a data provision unit that supplies contents of the data packet; and/or
a determination of which of the at least two transmission paths has a minimum prediction value.

8. The method as recited in claim 1, wherein;
the transmission path information item is transmitted to a data provision unit supplying contents of the data packet; and
contents and/or a transmission time and/or a transmission frequency of one or more additional data packets to be transmitted in the future within a predefined time frame are adapted to the prediction values included in the transmission path information item using the data provision unit and/or the planning unit.

9. The method as recited in claim 1, wherein for each of the transmission paths, the transmission path information item further includes another prediction value predicted for the particular data packet by a determination unit outside of the transmitter unit.

10. A non-transitory machine-readable storage medium on which is stored a computer program for performing transmissions from a transmitter unit to a receiver unit connectable to the transmitter unit via at least two transmission paths, the computer program, when executed by a computer of the transmitter unit, causing the computer to perform the following steps:
for each particular data packet of a plurality of data packets, responsive to the particular data packet becoming available for transmission by the transmitter unit:
ascertaining a respective prediction value of at least one transmission path parameter for each of the at least two transmission paths via which the receiver unit is connectable to the transmitter unit, wherein each of the prediction values is a value, which the computer predicts specifically for the particular data packet, will be present during a transmission of the particular data packet from the transmitter unit to the receiver unit;
making a selection for the particular data packet, wherein:

the selection includes selecting, based on the ascertained prediction values, one transmission path from the at least two transmission paths; and the selected transmission path is selected to be used for transmitting the particular data packet; and outputting, as a function of the selected transmission path, a transmission instruction signal that instructs the transmitter unit to perform the transmission of the particular data packet on the selected transmission path;

wherein the selecting is performed specifically for transmissions from the transmitter unit independent of any path selection performed for other transmitter units.

11. The method as recited in claim 1, further comprising:

monitoring a surrounding area of a vehicle, the monitoring being performed using a sensor system that includes at least one sensor that is positioned on the vehicle and that, based on the monitoring, generates sensor data, wherein the data packet includes the sensor data;

performing, by the transmitter and in response to the output transmission instruction signal, the transmission of the data packet, including the sensor data, to the receiver;

wherein:

the transmitter is part of the vehicle;

the receiver is external to the vehicle;

the receiver, to which the data packet has been transmitted, is configured to output, as a function of the transmitted data packet, a control signal that controls the vehicle indirectly or directly.

12. The method as recited in claim 1, wherein the short-term determination unit includes a neural network that has been trained to output the respective prediction values of the at least one transmission path parameter for each of the at least two transmission paths, the training comprising:

providing the neural network with one or more input variables selected from a wireless technology of the transmission paths, a current characteristic of the transmission paths, a state of a network device of the transmitter unit, one or more measured or estimated values of a transmission path parameter of the transmission paths, packet characteristics of the data packet to be transmitted, a state or characteristic of the transmitter unit, and a current time of day or day of the week; and providing, as a setpoint output variable for the training, a measured value of the at least one transmission path parameter of the at least two transmission paths, the measured value being measured during a prior data packet transmission from the transmitter to the receiver.

13. A system comprising:

processing circuitry that includes at least one processor, wherein:

the processing circuitry is configured to perform the following operations for each particular data packet of a plurality of data packets, responsive to the particular data packet becoming available for transmission by a transmitter:

ascertaining, using a determination function, a respective prediction value of at least one transmission path parameter for each of at least two transmission paths via which a receiver is connectable to the transmitter, a transmission path information item including the prediction values being provided to a planning function executed by the processing circuitry and each of the prediction values being a value, which the determination function predicts specifically for the particular data packet, will be present during a transmission of the particular data packet from the transmitter to the receiver;

making a selection for the particular data packet using the planning function, the selection including selecting, based on the transmission path information item, one transmission path of the at least two transmission paths, and the selected transmission path being selected to be used for transmitting the particular data packet; and outputting, using the planning function and as a function of the selected transmission path, a transmission instruction signal that instructs the transmitter to perform the transmission of the data packet on the selected transmission path; and the planning function performs the selecting specifically for transmissions from the transmitter independent of any path selection performed for other transmitters.

14. The system as recited in claim 13, further comprising:

the transmitter, wherein the transmitter includes:

a first wireless communication interface configured to transmit the data packet to the receiver on a first of the at least two transmission paths, in response to the output transmission instruction signal; and a second wireless communication interface configured to transmit the data packet to the receiver on a second of the at least two transmission paths in response to the output transmission instruction signal.

* * * * *